United States Patent
Young

(10) Patent No.: US 6,769,702 B2
(45) Date of Patent: Aug. 3, 2004

(54) REINFORCED AND WHEELED REFUSE CONTAINER

(75) Inventor: Roger L. Young, Brentwood, MO (US)

(73) Assignee: Young Manufacturing Co., LLC, St. Louis, MO (US)

( * ) Notice: Subject to any disclaimer, the term of this patent is extended or adjusted under 35 U.S.C. 154(b) by 0 days.

(21) Appl. No.: 10/113,656

(22) Filed: Mar. 29, 2002

(65) Prior Publication Data

US 2002/0153681 A1 Oct. 24, 2002

Related U.S. Application Data

(60) Provisional application No. 60/280,340, filed on Apr. 2, 2001.

(51) Int. Cl.[7] .................................................. B62B 1/00
(52) U.S. Cl. ........................ 280/47.26; 280/47.15; 280/47.21
(58) Field of Search ........................... 280/47.34, 47.35, 280/47.371, 47.131, 47.15, 47.17, 47.21, 47.24, 47.26, 79.05, 79.11; 220/908

(56) References Cited

U.S. PATENT DOCUMENTS

| 3,831,959 A | * | 8/1974 | Fontana ..................... 280/79.1 |
| 3,876,223 A | | 4/1975 | O'Reilly et al. |
| 4,450,976 A | | 5/1984 | Snyder et al. |
| D292,638 S | | 11/1987 | Carville |
| 4,878,592 A | * | 11/1989 | Lee ........................ 220/23.83 |
| 4,900,043 A | * | 2/1990 | Kho ............................. 280/37 |
| 5,088,750 A | | 2/1992 | Beese et al. |
| 5,103,994 A | | 4/1992 | Doxey et al. |
| 5,465,844 A | | 11/1995 | Lee |
| 5,489,107 A | * | 2/1996 | Kho ....................... 280/47.131 |
| 5,547,104 A | | 8/1996 | Parker |
| 5,582,322 A | | 12/1996 | Prout et al. |
| D413,189 S | | 8/1999 | Conti |
| 6,145,856 A | | 11/2000 | Conti |
| 6,328,320 B1 | * | 12/2001 | Walski et al. ............. 280/47.26 |
| 2002/0014488 A1 | * | 2/2002 | Schermel .................. 220/23.4 |
| 2003/0025303 A1 | * | 2/2003 | Perelli et al. ............... 280/651 |

FOREIGN PATENT DOCUMENTS

JP            2001-39314      *   2/2001

* cited by examiner

*Primary Examiner*—Avraham Lerner
(74) *Attorney, Agent, or Firm*—Paul M. Denk

(57) ABSTRACT

A reinforced and wheeled refuse container including a container body, having one or more handles secured proximately opposite upper edges, and a wheel structure secured to the bottom of the container housing, to facilitate maneuverability of the refuse container during usage. In its assembly, though, the container housing may incorporate integral boss-like structure that can inherently form threads, a bayonet lock, or any other type of fastening, so that fasteners may be readily secured thereto, for rigidly holding the handles and wheeled structures in place, to facilitate the quick and easy assembly of the refuse container, through a minimum of effort. The wheeled structure may incorporate integrally molded support for an axle, for holding the container wheels in place, during assembly and usage.

11 Claims, 6 Drawing Sheets

REINFORCED AND WHEELED REFUSE CONTAINER

CROSS REFERENCE TO RELATED APPLICATION

Ser. No. 60/280,340, filed Apr. 4, 2001.

BACKGROUND OF THE INVENTION

This invention relates generally to a refuse container, and more specifically, one that may be blow molded, or injection molded, from a polymer, and contain attributes that allows for its very easy assembly, from a minimum of parts, but yet be substantially reinforced, to furnish a wheeled refuse container, that enhances the longevity of its usage.

Obviously, there are many refuse containers that are available upon the market, and have been so for a good number of years. Many of these are molded from polymer, whether it be injection or blow molded. These containers have various types of lids that attach to them, and lock in place, and are reasonably sturdy, but in those instances where the containers may be blow molded, and are generally fabricated of a thinner polymer material, they have a tendency to wear out, along their pressure points, as at the bottom, when the heavily laden containers are drug over the surface, to a location for either storage or disposal. There are even refuse containers that include means to facilitate their movement, such as through the application of wheels, at the bottom, which somewhat lessens the degree to which the containers wear out, at least through abrasion, as previously used.

As can be seen in the prior art, the patent to O'Reilly, et al, U.S. Pat. No. 3,876,223, shows a baseball equipment storage and transporting cart. It includes the cart body, made of plastic, metal, or the like, and having a handle at its upper end, in addition to one at its bottom, and is mounted upon a pair of wheels, to facilitate its movement.

The patent to Snyder, et al, U.S. Pat. No. 4,450,976, shows a wheeled, molded container with hinged lid. As you can see, the refuse container is a molded body, of polymer, and has a lower portion that furnishes clearance, by means of its shown depression, for mounting of wheels upon its disclosed axle.

The design patent to Carville, U.S. Pat. No. Des. 292,638, discloses a wheeled refuse container. It also includes a pair of wheels, a handle to facilitate its movement, all mounted upon the body portion of the container.

The patent to Beese, et al, U.S. Pat. No. 5,088,750, is upon a multi-functional waste container. This container may be of a wheeled design, and is of a much more detailed structure than the current design, and because of its configuration, would not appear to be of a structure that could be fabricated by blow molding. For example, the container body has an upper portion and a lower portion, and the upper portion has a greater horizontal cross section than the lower portion, as can be noted.

The patent to Doxey, et al, U.S. Pat. No. 5,103,994, shows a locking system for a waste receptacle. This patent is more oriented towards the locking system for the lid, rather than the overall structural attributes of the formed receptacle.

The patent to Lee, U.S. Pat. No. 5,465,844, shows another wheeled refuse container, it does explain that the container is nestable with other containers, generally because the wheels pivot into a closure position, as noted.

The patent to Parker, U.S. Pat. No. 5,547,104, shows a waste container with a dump handle. This device shows a formed handle at its bottom, and also at its top, for use to facilitate its dumping, as can be noted. It does have wheels, at its bottom, and which afford clearance, either for location of the wheels, or to allow the device to be tilted.

The patent to Prout, et al, U.S. Pat. No. 5,582,322, is upon a rotationally-molded refuse container with integrally-molded handle sealed from communication with its refuse carrying compartment. This particular container, which incorporates a form of hollow protrusion, is designed for carrying purposes, as can be noted.

The design patent to Conti, U.S. Pat. No. Des. 413,189, is upon a wheeled container.

Another patent to Conti, U.S. Pat. No. 6,145,856, shows a further wheeled container. This device, while having first and second wheel receiving pockets, is designed and described as incorporating spring clips for holding the wheel assemblies in place.

SUMMARY OF THE INVENTION

This current invention contemplates the formation of a refuse container, which may be molded from polymer, either by injection molding, but preferably blow molding, which may be lesser expensive, and as all of its structural attributes that can provide for its assembly from a minimum of components, all of which may be fabricated by blow molding, through the exertion of a minimum of effort. This device includes a molded container that may have integrally formed into its upper structure, either along one upper edge, or upon two opposite upper edges of the container, mounting means, in the form of a boss, that may be threaded, and upon which a molded handle may locate, and then held in place by means of a threaded fastener, for immediate installation. The lower end of the container, at least on one side edge, may be provided with a related type of integrally molded fastening means, which can even be achieved through blow molding, and which is designed for accommodating a fastener, such as through threaded or otherwise engagement, for securement of a lower structure thereto, that may integrally incorporate a handle means, to facilitate the easy lifting, by two hands, of the entire container. In addition, the container includes means for supporting the locating of an axle and a pair of wheels, to further ease the ability of the container to be moved, as by rolling. In addition, the bottom lower edge of the container, proximate the location of the fastening of the wheeled structure thereto, may be molded with a inclined surface, to provide clearance, and to eliminate the potential for wear out of the bottom edge of the container, as through abrasion, as has frequently occurred, with previous styles of refuse containers, as earlier reviewed.

The lower handle that is molded integrally with the structure of the wheel supporting means, may be either fabricated as a separate handle, or it can be molded by way of a hand hold into the structure of the wheel supporting member, during its fabrication.

It is, therefore, the principal object of this invention to provide a wheeled refuse container that can be fabricated from a minimum of components, all molded from a polymer, preferably by blow molding, and yet assembled in a two or three step process, to complete the fabrication of the entire container that is ready for usage as a refuse container.

Another object of this invention is to provide a refuse container that may be fully fabricated and injection or blow molded in a single operation.

Another object of this invention is to provide for a refuse container, that may be blow molded from a minimum of polymer material, and therefore, is very lightweight in usage, but yet significantly sturdy and strong of structure, to provide it with a sustained useful life.

Still another object of this invention is provide a refuse container that may be very easily moved during usage by the worker, even through it may be laden with significantly bulk or heavy waste or other material.

These and other objects may become more apparent to those skilled in the art upon review of the summary of the invention as provided herein, and when considered with the description of the preferred embodiment, for this container, as hereinafter set forth.

DESCRIPTION OF THE PREFERRED EMBODIMENT

Figure 1:
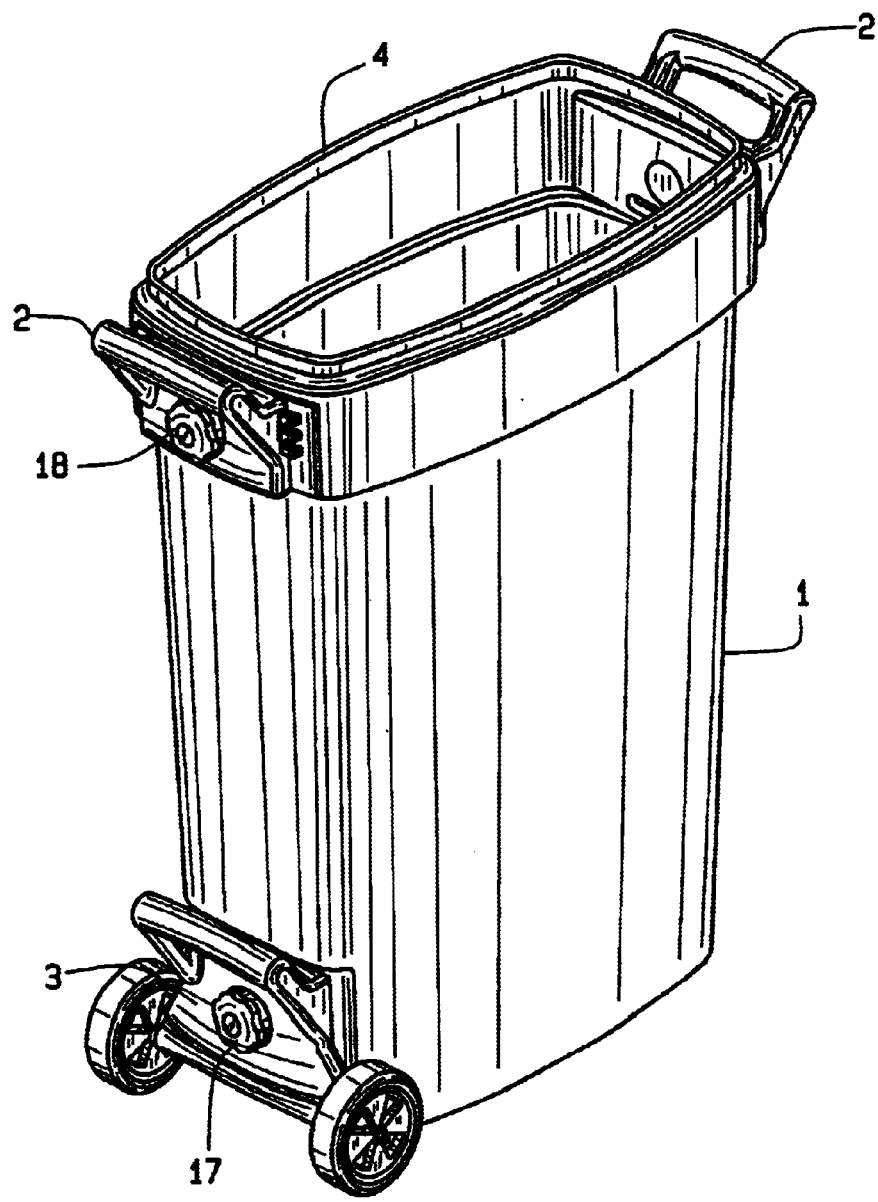
FIG. 1 is a perspective view of the molded, wheeled refuse container of this invention.

In referring to the drawings, and in particular FIG. 1, therein is shown the refuse container of this invention, including a container body 1 that has handles 2 secured by fastening means proximate its upper edge, and further includes a wheeled structure 3, further secured proximate the lower edge of one side of the said container body. Generally, the container body will be molded, as by blow molding, in one step, and includes an upper edge 4, formed to accommodate a lid (not shown) thereon, to afford closure to the refuse container.

Figure 2:
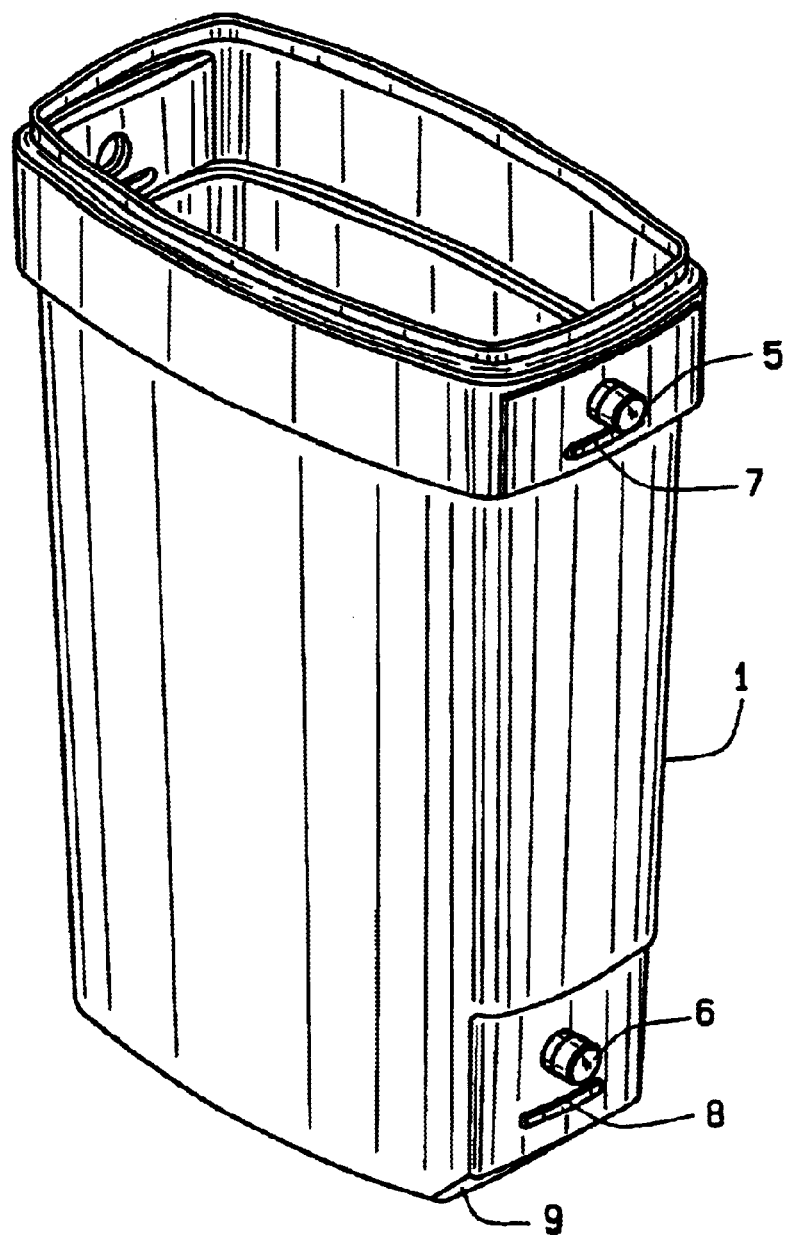
FIG. 2 shows the container body as fabricated from a singular injection or blow molding operation.

As can be seen in FIG. 2, the container body 1 in this instance, may be of a blow molded fabrication, and includes a pair of bosses 5 and 6, which may be molded integrally with the container body, and may further include, from the molding process, some threads, or other means for fastening, or a bayonet lock, in order to accommodate a fastening means thereon, when securing the handle and the wheeled structure, respectively, to the upper and lower portions of the container body. Obviously, as can be understood, such type of molding can be accommodated, either by injection, but preferably blow molding, if the two halves of the mold separate at the midpoint of the bosses 5 and 6, as known in the art. Furthermore, there may be ribs 7 and 8 likewise molded into the structure of the container body, and these may be for locating the handle structure 2, and the wheeled structure 3, to the container body, when they are fastened in place about the threaded bosses 5 and 6. In addition, the bottom edge 9 of the container body may be molded at an incline, to afford clearance to the wheeled structure 3 when it is fastened in place, and to eliminate the potential for this edge of the container from rubbing upon the ground, and abrasively deteriorating, during wheeled usage of the refuse container.

Figure 3:
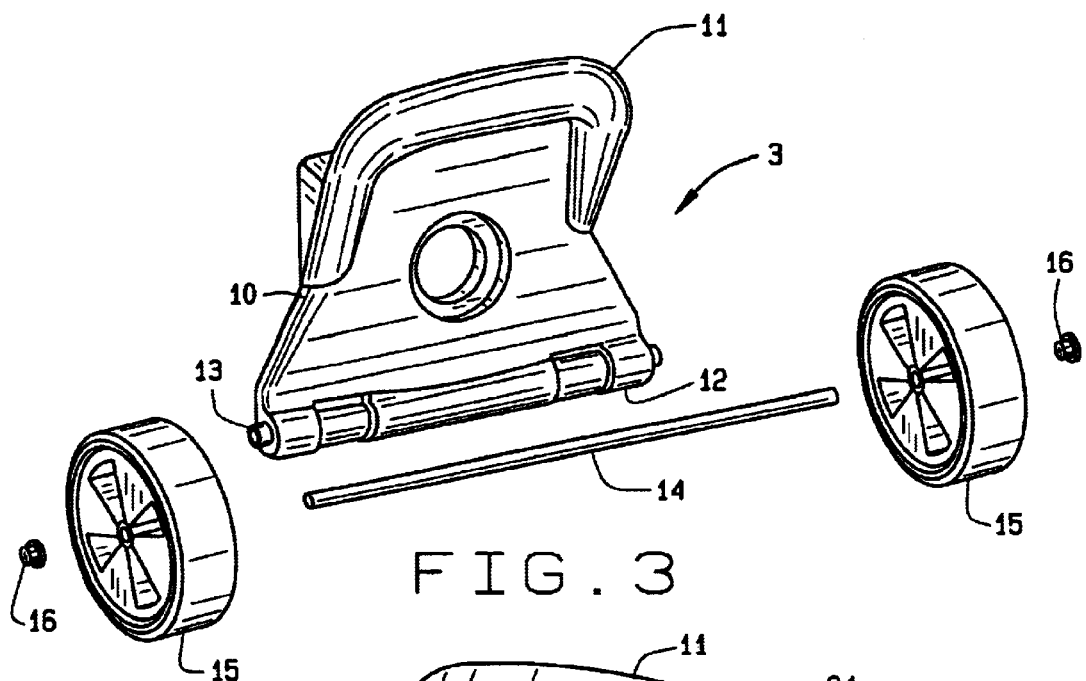
FIG. 3 shows the wheeled structure that promptly connects to the lower edge of one side of the container body.

FIG. 3 shows the wheeled structure 3 of this invention. It includes a handle structure 10 which is molded with an integral handle 11 extending upwardly and forwardly thereof, and which is conveniently arranged to facilitate its grasping by one hand, as when the refuse container is being lifted, as during dumping. In addition, the bottom edge 12 of the handle structure includes a molded reinforcement, and one through which an aperture, as at 13, may extend from one side of the handle structure to the other, and through which the axle 14 can locate. Once the axle is inserted therethrough, the wheels 15 may be mounted onto the axle, and the compression or wire nuts 16 may be forced onto the ends of the axle 14, for securing the wheels reasonably permanently in place. As can further be seen in FIG. 1, the fastener 17 can threadedly or otherwise secure onto the boss 6, for tightly and rigidly securing the wheeled structure 3 in place to the bottom edge of the container housing 1. Likewise, the fastener 18 can secure onto the boss 5, for securing the handle 2, on one side, permanently to the upper edge of the container body, as can be noted.

Figure 4:
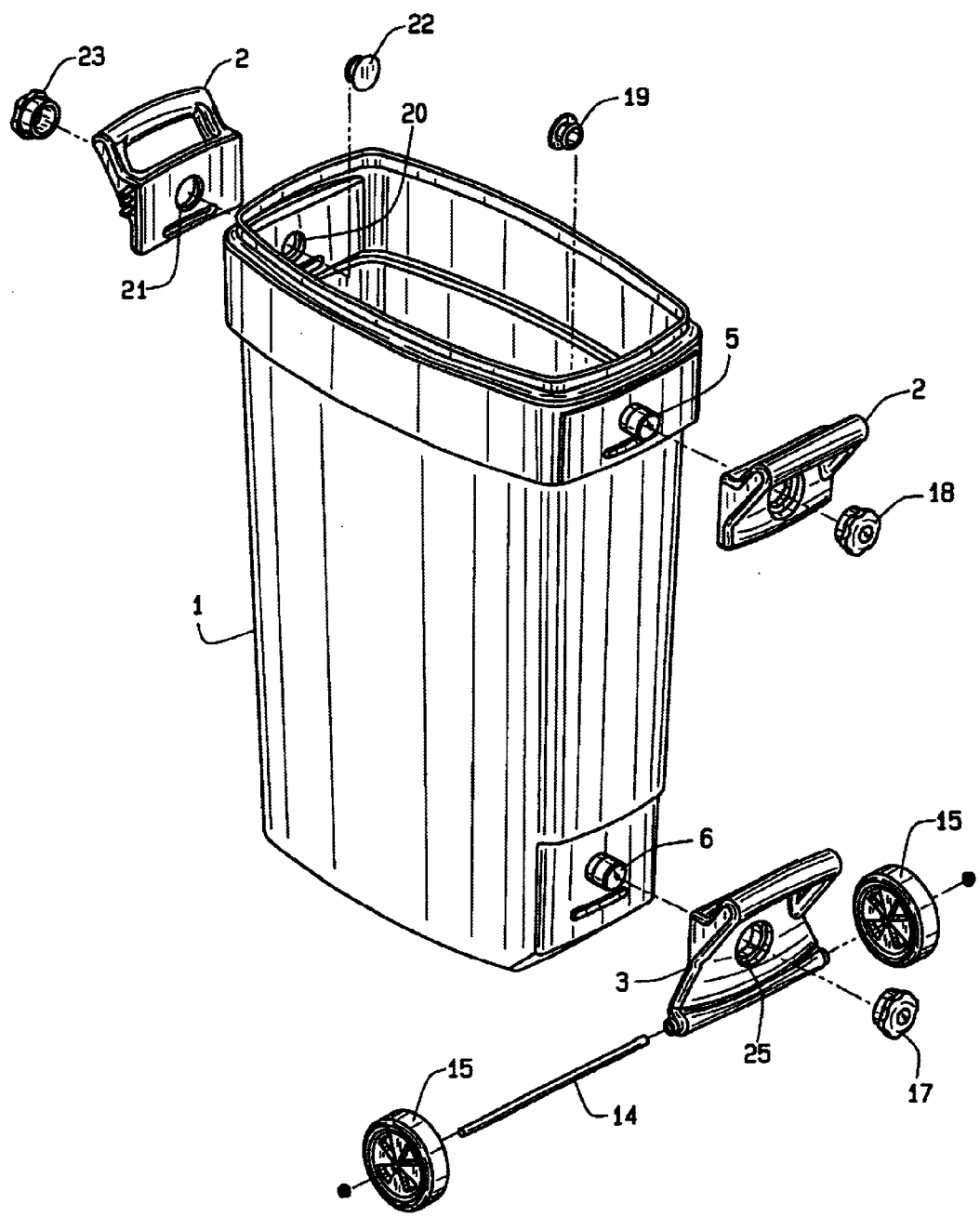
FIG. 4 is an exploded view of all of the molded components that are assembled into the wheeled refuse container of this invention.

FIG. 4 shows the refuse container, in an exploded view, with some slight modifications. The container body 1 in this instance, is shown having the wheeled structure 3 with axle 14 and the wheels 15 ready for securement by the fastener 17 onto the lower boss 6 of the container housing.

At the upper edge of the container housing there is shown two methods for securement of the handles 2 in place. In one instance, the handle can mount directly to the boss 5 and held by its fastener 18 proximate the upper edge of the housing, as noted. A plug 19 may tightly fit into the opening formed from blow molding of the structured and integral boss 5, to seal this opening from the inside of the container housing.

On the opposite side upper edge of the container housing 1, the other handle 2 may likewise secure in place. It may be secured onto another formed boss (not shown), or there may be an aperture 20 provided through the housing, the handle 2, with its aperture 21, aligned therewith, and an enlarged fastener, such as a threaded or otherwise type of means 22, such as a bolt, may be arranged through the opening 20, and have secured thereto the fastener 23 to rigidly secure the handle 2 in place, as can be understood. This just describes an alternative means for securement of a handle 2, rigidly and permanently to the upper edge of the container housing 1, as noted.

Figure 5:
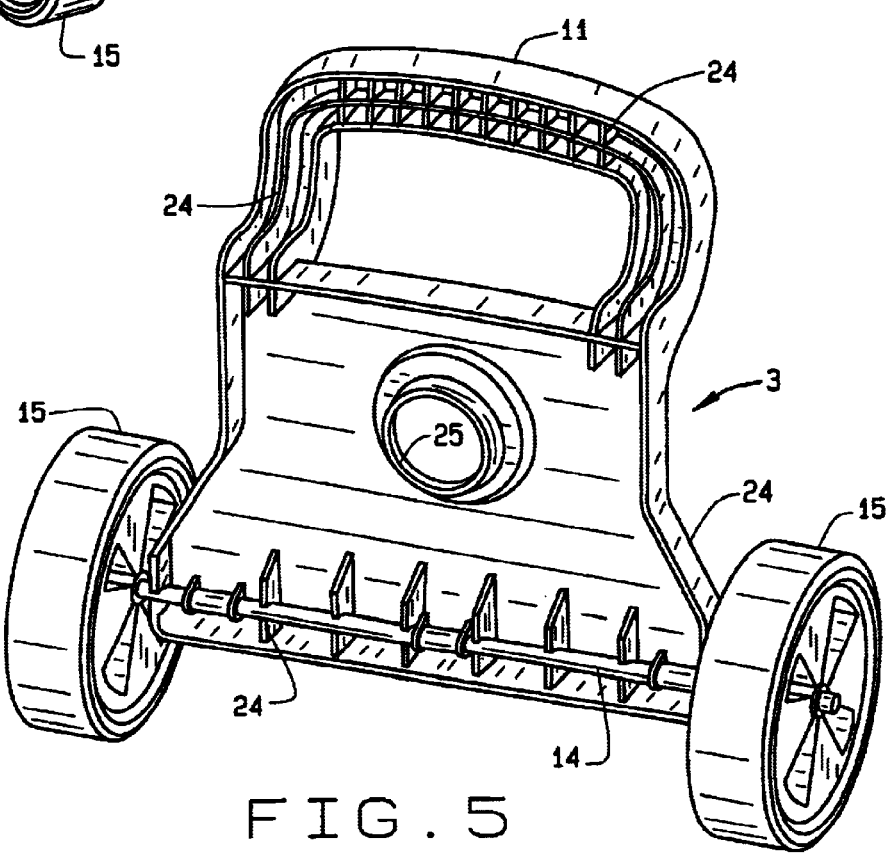
FIG. 5 shows a back view of the wheeled structure that mounts to the lower segment of the container body of this invention.

FIG. 5 shows an opposite side view of the wheeled structure 3, and indicates how it may be fabricated, from molding, to have variously arranged reinforcement, as can generally be noted at 24, throughout its structure, in order to strengthen handle structure, so that once it is secured in place, by means of locating of its aperture 25 onto the integral boss 6, and fastened in place, the handle will yet have sufficient rigidity so that its wheels 15, as mounted upon the axle 14, will have sufficient strength to provide for maneuvering of the refuse container, even when heavily laden with bulk or waste material, and its handle part 11 can likewise be grasped, to provide for lifting of the container body, when it is to be emptied. This reinforcement will allow for the sustained usage of the wheeled structure, for a long period of time, without deterioration.

Figure 6:
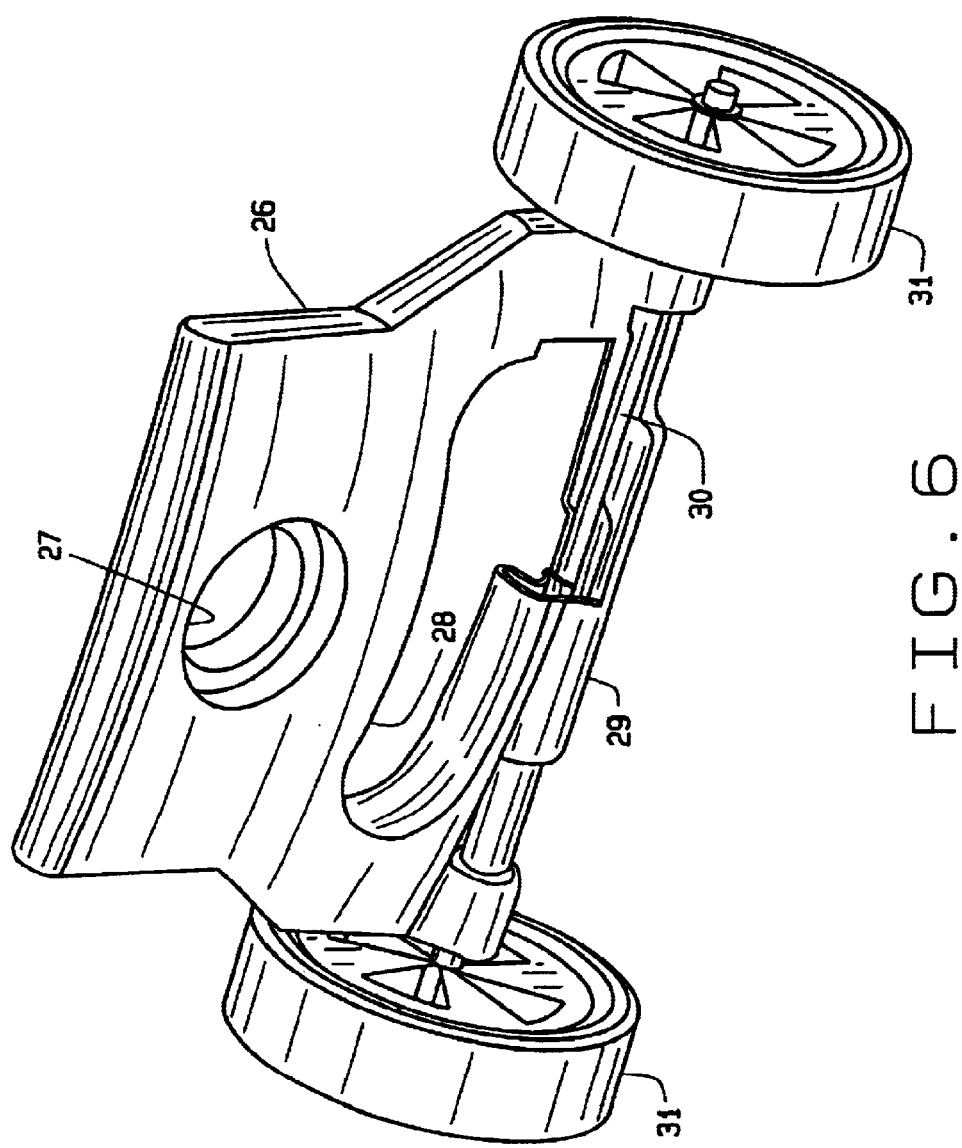
FIG. 6 shows a modified form of wheeled structure for mounting to the lower section of the container body of this invention.

FIG. 6 shows a further modification to the wheeled structure 26 of this invention, wherein its aperture 27 may be mounted onto, for example, the integral boss 6 of the container body 1, when secured thereto, but in the lower portion of the wheeled structure there is shown an integrally formed hand hole 28, wherein the container body may be grasped, at this location, when the refuse container is to be lifted, its waste disposed of, as when being emptied. As can further be noted, the bottom edge 29 of the wheeled structure 26 includes its axle 30 (partially cut away for better viewing), for mounting the wheels 31, in the manner as previously described.

Figure 7:
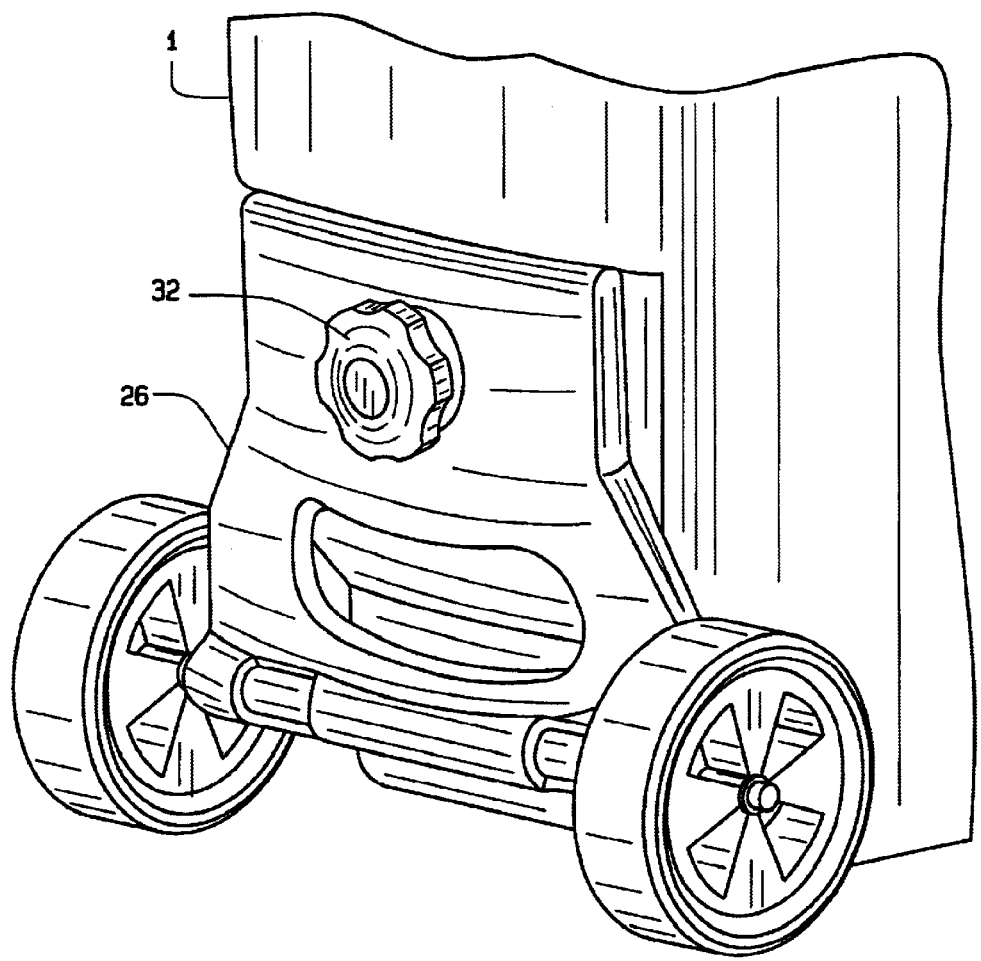
FIG. 7 shows the wheeled structure of FIG. 6 as secured by fastening means to the lower edge of one side of the container body of this invention.

FIG. 7 shows how the wheeled structure 26, as previously reviewed, can be easily accommodated and permanently fastened to the bottom of the container housing 1, by means of the fastener 32, in the manner as previously explained.

Variations or modifications to the subject matter of this invention may occur to those skilled in the art upon reviewing the various elements and components for this refuse container as shown and described herein. For example, other means can be used for connecting the handles and wheeled structure to the container body, whether it be through the simple usage of a nut and bolt combination, or by means of the threaded or bayonet fastening of the type of fasteners 17, 18 and 32 onto the protruding bosses 6, of the container housing 1, as previously depicted. These are examples as to how variations may be made to the structure, without departing from the scope of this invention. Any such variations, if within the scope of this invention, as summarized and described herein, are intended to be encompassed within the principle of this development, as explained.

I claim:

1. A reinforced and wheeled refuse container comprising a container body, a separate wheeled structure secured to a bottom edge of the container body, a boss integrally molded extending from the container body proximate centrally of its lower edge, said boss having fastening means provided thereon, the approximate lower edge of the container body being shaped to accommodate the mating location of the separate wheeled structure thereto, and fastening means provided for securement of the wheeled structure to the container body boss, said fastening means provided centrally of the wheeled structure, when the wheeled structure is assembled onto the container body for usage of the refuse container.

2. The refuse container of claim 1 wherein the connection between the wheeled structure and the boss of the container body comprises a threaded engagement.

3. The refuse container of claim 1 wherein the connection between the separate wheeled structure and the boss of the container body comprises a bayonet lock.

4. The refuse container of claim 1 wherein said separate wheeled structure having an integral handle projecting upwardly and forwardly therefrom, to facilitate the grasping of the lower end of the container body during emptying of the contents of the refuse container during usage.

5. The refuse container of claim 1 wherein the separate wheeled structure incorporates an integral handhole formed therethrough and provided for facilitating the grasping of the lower end of the container body during emptying of the contents of the refuse container during usage.

6. The refuse container of claim 1 wherein said separate wheeled structure has a lower integrally molded axle mount provided along its lower edge, an axle disposed for locating through the axle mount, and the ends of the axle provided for accommodating wheels to facilitate the rolling movement of the refuse container during usage.

7. The refuse container of claim 1 wherein said container body, at its lower edge, having a bevel, and said bevel providing for clearance of the refuse container when tilted and rolled during its usage.

8. The refuse container of claim 1 and including a rib provided upon one of the handle structure and the proximate upper edge of the container body to provide for locating of the handle structure to the container body during its assembly through tightening of the fastening means upon its boss.

9. The refuse container of claim 1 wherein the container body having a taper along its height, narrowing at proximate the lower edge of the container body, so that a plurality of said container bodies may be nested together during storage and display.

10. A reinforced and wheeled refuse container comprising a container body, a wheeled structure secured to a bottom edge of the container body, a boss integrally molded extending from the container body proximate its lower edge, said boss having fastening means provided thereon, the approximate lower edge of the container body being shaped to accommodate the mating location of the wheeled structure thereto, fastening means provided for securement of the wheeled structure to the container body boss, when the wheeled structure is assembled onto the container body for usage of the refuse container, a boss integrally formed extending from the approximate upper edge of one side of the container body, an integrally molded handle structure provided for locating upon the container body boss, fastening means for secruement of the handle structure to the container body and its boss, to facilitate the grasping and tilting of the container body during the wheeled movement of the refuse container.

11. A reinforced and wheeled refuse container comprising a container body, a wheeled structure secured to a bottom edge of the container body, a boss integrally molded extending from the container body proximate its lower edge, said boss having fastening means provided thereon, the approximate lower edge of the container body being shaped to accommodate the mating location of the wheeled structure thereto, fastening means provided for securement of the wheeled structure to the container body boss, when the wheeled structure is assembled onto the container body for usage of the refuse container, a boss integrally formed extending from the approximate upper edge of one side of the container body, an integrally molded handle structure provided for locating upon the container body boss, fastening means for secruement of the handle structure to the container body and its boss, to facilitate the grasping and tilting of the container body during the wheeled movement of the refuse container, a rib provided upon one of the wheeled structure and the proximate lower edge of the container body to provide for locating of the wheeled structure to the container body during its assembly through tightening of the fastening means upon its boss.

* * * * *